United States Patent

[11] 3,535,991

| [72] | Inventor | Kiyoshi Kitai<br>Tokyo, Japan |
|---|---|---|
| [21] | Appl. No. | 710,842 |
| [22] | Filed | March 6, 1968 |
| [45] | Patented | Oct. 27, 1970 |
| [73] | Assignee | Kabushiki Kaisha Hattori Tokeiten<br>Tokyo, Japan |
| [32] | Priority | March 7, 1967, March 7, 1967 |
| [33] | | Japan |
| [31] | | 42/14,014 and 42/14,015 |

[54] FLASH PHOTOGRAPH OBSTRUCTING DEVICE IN AN ATTACHMENT OR A DETACHMENT OF A FLASH DEVICE
7 Claims, 4 Drawing Figs.

[52] U.S. Cl. .................................................. 95/11,
95/11.5, 95/10
[51] Int. Cl. ........................................................ G03b 19/00
[50] Field of Search .......................................... 95/11, 11
(Lamp). 11.5, 10(C)

[56]     References Cited
UNITED STATES PATENTS

| 2,899,880 | 8/1959 | Graef ............................ | 95/11.5 |
| 3,307,462 | 3/1967 | Hutchison et al ........ | 95/11(Lamp)UX |
| 3,374,718 | 3/1968 | Hochreiter ................... | 95/11.5UX |
| 3,393,620 | 7/1968 | Reiche et al ............... | 95/11 |
| 3,426,661 | 2/1969 | Wick et al. ................. | 95/10(C) |
| 3,440,938 | 4/1969 | Stimson et al ............. | 95/10(C) |
| 3,439,597 | 4/1969 | Wagner ........................ | 95/11.5 |

Primary Examiner—Norton Ansher
Assistant Examiner—Robert P. Greiner
Attorneys—Robert E. Burns and Emmanuel J. Lobato ABSTRACT: A camera is provided with a photosensitive element for sensing the brightness of an intended subject, and a shutter mechanism for automatically taking a daylight exposure if the brightness is above a selected level, or a flash exposure if the brightness is below a selected level. A detecting circuit is also included in the camera for detecting whether an associated flash illumination device is in operative condition. The detecting circuit checks the charging of a capacitor which supplies power to the flashbulb and prevents an exposure in the event the flash device is not operative.

Patented Oct. 27, 1970 3,535,991
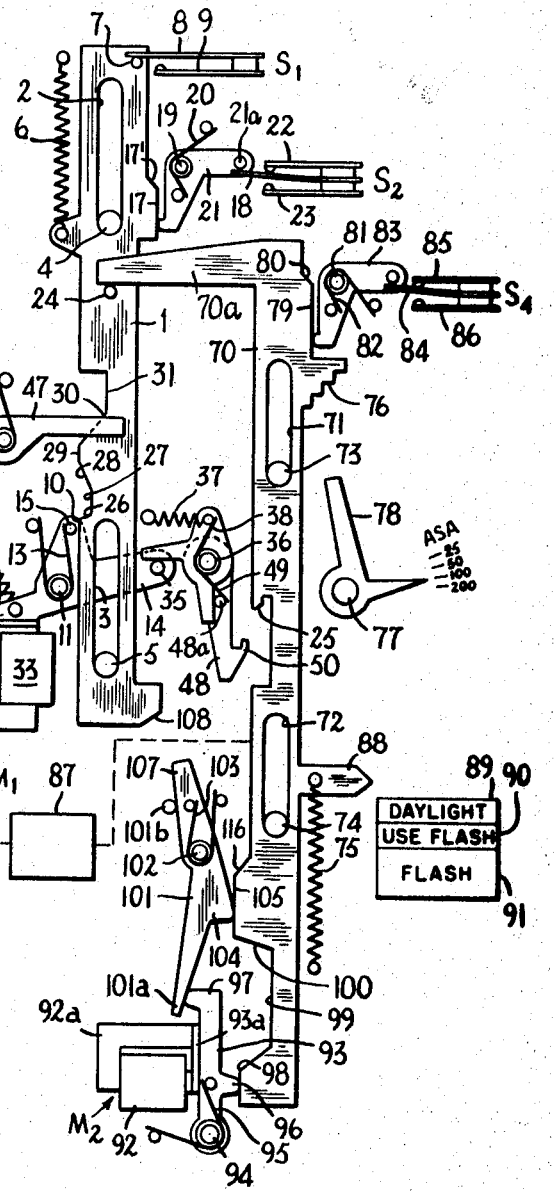
FIG. 1
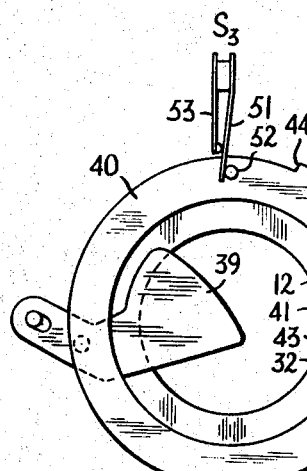
FIG. 2
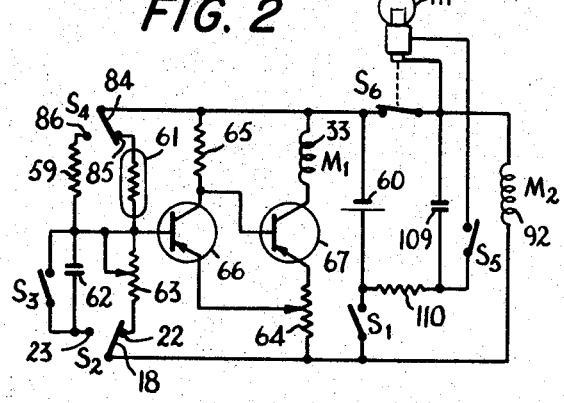
FIG. 3
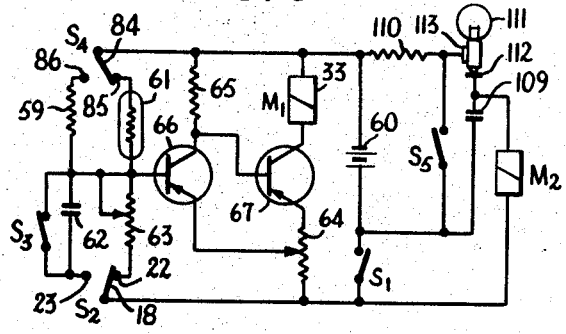
FIG. 4
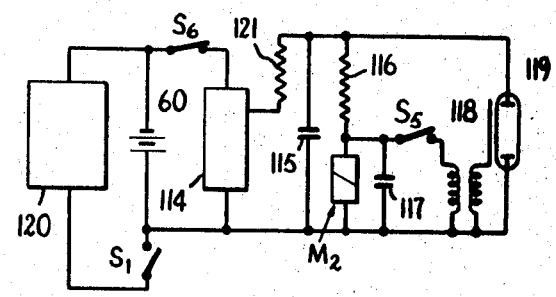

3,535,991

FLASH PHOTOGRAPH OBSTRUCTING DEVICE IN AN ATTACHMENT OR A DETACHMENT OF A FLASH DEVICE

The present invention relates to a camera having means for sensing the brightness of the intended subject prior to an exposure and for automatically selecting a daylight exposure or a flash exposure according to whether the subject brightness is above or below a selected value.

A camera of this kind is quite convenient for users but has the disadvantage that if a flash illumination device (for example a flashbulb or an electric flash device) has not been fitted on the camera or is not in proper operating condition, an excessive underexposure occurs when the camera operates for a flash exposure and there is no flash.

It is an object of the present invention to overcome such disadvantage by providing means for detecting prior to an exposure whether a flash device has been fitted on the camera and whether it is in operative condition. In the event that the brightness of the subject is below a selected level so as to call for a flash exposure but a flash device is not in position on the camera or is not in operative condition, the detecting device functions to indicate to the user that a flash exposure should be used. Moreover, the detecting device may control means for preventing selection of a flash exposure under these conditions so that the camera is set for a daylight exposure which is automatically controlled to provide a long exposure and thereby take a satisfactory picture even though the level of subject brightness is below what ordinarily would be used for a daylight exposure. The detecting device may also be used to block any exposure by the camera in the event the brightness of the subject is below a selected level and no flash device has been provided or is not in proper operative condition.

The invention together with its features and advantages will be more fully understood from the following description of preferred embodiments shown by way of example in the accompanying drawings in which:

FIG. 1 is a schematic developed view of principal portions of an automatic shutter mechanism for a camera in accordance with the invention;

FIG. 2. is a diagram of the electric circuit of the shutter mechanism as shown in FIG. 1; and FIGS. 3 and 4 are circuit diagrams showing modifications of the electric circuit.

With reference to FIG. 1, the shutter mechanism comprises a release lever 1 which is guided for movement upwardly and downwardly by pins 4 and 5 which are mounted on a suitable support and are slidably received in guide grooves 2 and 3 of the release lever. A tension spring 6 having one end attached to the release lever 1 and the other end attached to a suitable support biases the release lever to its upper position as shown in FIG. 1. In this position, a pin 7 on the release lever engages a contact piece 8 of a power source switch S1 so as to disconnect it from the contact 9 and thereby hold the switch in open position. A side face 17 of the release lever 1 engages a switch lever 21 of a changeover switch S2 which is pivotally mounted on a shaft 19 and is biased to turn in a clockwise direction by a spring 20. A contact piece 18 of the changeover switch S2 is normally biased so as to engage a contact 22 and is engageable by a pin 21a on the switch lever 21 to disengage it from contact 22 and bring it into engagement with contact 23 when the release lever 1 is moved downwardly sufficiently that a step 17' in the side face of the release lever permits the switch lever 21 to be rotated in a clockwise direction by its spring 20. When the release lever 1 is in its upper position as shown in FIG. 1, the side face 17 holds the switch lever 21 in a counter-clockwise position and hence the contact piece 18 of the changeover switch S2 is in engagement with contact 22.

A contoured side face 10, 26, 27, 28, 29, 30 and 31 of the release lever 1 is engageable with a pin 15 of a closing lever 14 which is pivoted on a shaft 11 and is biased to turn in a clockwise direction by springs 12 and 13. When the release lever 1 is in its upper position, the closing lever 14 is held in open position by engagement of pin 15 with the side edge 10 of the release lever 1 as shown in FIG. 1. The closing lever 14 carries a magnetic armature 32 of an electromagnet M1 having a coil 33 and an iron core 34. When the electromagnet is energized, the closing lever 14 is held in open position as illustrated in FIG. 1 by attraction of the armature 32 to the iron core 34. When the release lever 1 is moved downwardly, side faces 26, 27, 30 and 31 of the release lever permit the closing lever 14 to be turned in a clockwise direction by its springs 12 and 13 providing the closing lever is not retained in open position by the electromagnet M1. An intermediate side edge portion 29 of the release lever 1 is engageable with pin 15 to position the closing lever in open position.

Shutter blades 39 (of which only one is shown) are operable by a ring 40 which is rotatable in a clockwise direction by the spring 12 to open the shutter blades and is rotatable in a counter-clockwise direction to close the shutter by engagement of side face 42 of the closing lever 14 with a pin 41 on the ring when the closing lever rotates in a clockwise direction from the position shown in FIG. 1. Prior to an exposure, the shutter operating ring 40 is held in closed position by engagement of a projection 44 on the ring with a detent member 47 which is pivotally mounted on a shaft 45 and biased to turn in a counter-clockwise direction by a spring 46. At a predetermined point in the downward movement of the release lever 1, the detent member 47 is engaged by a pin 24 on the release lever to disengage it from the projection 44 and thereby permit rotation of ring 40 in a clockwise direction by spring 12 to open the shutter. A pin 52 on the ring 40 presses a contact piece 51 of a timing switch S3 into engagement with a contact 53 to close the switch when the shutter is in closed position.

A selecting member 70 is guided for movement upwardly and downwardly by pins 73 and 74 slidably engaging guide grooves 71 and 72. A tension spring 75 acts downwardly on the selecting member 70 so as to hold an arm 70a of the release member in engagement with the pin 24 of the release lever 1 so that the selecting member follows downward movement of the release lever unless otherwise restrained. When a daylight exposure is to be made as determined by the electric circuit which will be described below, downward movement of the selecting member 70 is interrupted by the engagement of a hook portion 50 of a locking lever 48 with an engaging part 25 on the selecting member 70. The locking lever 48 is pivotally mounted on a shaft 36 and is actuatable by a middle lever 38 which is coaxially pivoted on the shaft 36 and is engageable with a pin 48a on the locking lever. A spring 49 acts on the pin 48a of the locking lever 48 to hold it normally in engagement with the middle lever 38. The middle lever 38 is biased by a spring 37 to turn in a counterclockwise direction so as to move the hook portion 50 of the locking lever 48 into the path of the engaging portion 25 of the selecting member 70. When the closing lever 14 is in open position as shown in FIG. 1, a pin 35 on the closing lever engages an arm of the middle lever 38 so as to rotate the middle lever 38 and locking lever 48 against the action of spring 37 so as to position the hook portion 50 of the locking lever out of the path of movement of the selecting member.

A side face 79 on the selecting member 70 engages the switch lever 83 of a changeover switch S4 having a contact piece 84 which is normally in engagement with a contact 85. The switch lever 83 is pivoted on a shaft 81 and is biased to turn in a clockwise direction by a spring 82. When the selecting member 70 moves downwardly a predetermined distance, a step 80 in the side face of the selecting member permits rotation of the switch lever 83 in a clockwise direction by spring 82 whereupon a pin 83a carried by the switch lever engages the contact piece 84 so as to disengage it from contact 85 and bring it into engagement with a second contact 86 of the changeover switch S4.

When a flash exposure is to be made, the locking lever 48 is held in inoperative position by the closing lever 14 acting through the middle lever 38 until engaging part 25 has passed the hook portion 50 so as to permit continued downward movement of the selecting member 70 with the release lever 1 until one or another of the steps of a stepped face 76 on the selecting member engages one end of a setting lever 78 which is adjustable about a pivot 77 and has a pointer 78a cooperating with a scale indicating the sensitivity of the film being used. It will be seen that the point at which the selecting lever 70 is stopped depends on the position at which the lever 78 is set and thus indicates the guide number of the film. An index shown in the form of a pointer 88 cooperates with indicia 89, 90 and 91 to indicate whether a daylight exposure or a flash exposure has been selected by the mechanism and the associated electric circuit and further indicating whether the flash device is in operative condition in the event light conditions call for a flash exposure. Means 87 provided between the selecting member 70 and the shutter control ring 40 includes known mechanism for setting the exposure aperture according to the amount of downward movement of the selecting member 70 as determined by setting of lever 78 and the setting of the camera according to the distance from the subject. The controlling device 87 is so constructed that it is not actuated when the amount of downward movement of the selecting member 70 is small, such as when the engaging part 25 of the selecting member 70 is engaged by the locking lever 48, but is actuated according to the position of the selecting member 70 when the selecting member moves down to a position in which the lever 78 engages one or another of the steps of the stepped part 76. Preferably the controlling device is of the kind shown and described in U.S. Pat. No. 3,326,108.

In accordance with the invention, means is provided for blocking the movement of the selecting member 70 at a selected point to indicate that light conditions call for a flash exposure but that there is no flash illumination device in proper operating condition. The blocking means is shown by way of example in the drawing as a lever 93 pivoted on a pin 94 and biased in a clockwise direction by a spring 95. When the selecting member 70 is in its uppermost position as shown in FIG. 1, the blocking lever 93 is held in an inoperative position by engagement of a projection 96 on the lever with a side face 98 of the selecting member. When the selecting member 70 is moved downwardly, a cut-out portion 99 permits the blocking lever 93 to be swung in a clockwise direction by its spring 95 to an operative position in which an end portion 97 is in position to be engaged by a shoulder 100 on the selecting member 70. Downward movement of the selecting member 70 is thereby stopped when the shoulder 100 engages the end 97 of the blocking lever 93. The point at which the selecting member 70 is stopped by the blocking lever 93 is selected so as to be slightly below that at which the selecting member is stopped by engagement of the locking member 48 with the engaging portion 25. In this position the pointer 88 registers with the indicia 90 which is shown as reading "USE FLASH".

Means is provided for holding the blocking lever 93 in inoperative position when a flash illumination device in proper operating condition is provided on the camera. Such means is illustrated in FIG. 1 as an electromagnet M2 having a coil 92, and iron core 92a and an armature 93a on the blocking lever 93. The electromagnet is controlled by the circuit described below. When the electromagnet is energized, it attracts the armature 93a to the iron core 92a and thereby holds the blocking lever 93 in inoperative position even when the selecting member 70 has been moved downwardly sufficiently to release the projection 96 on the blocking lever from the side face 98 of the selecting member.

Means may also be provided for blocking movement of the release lever 1 so as to prevent the making of any exposure when light conditions call for a flash exposure but a flash illumination device in proper operating condition has not been provided. Such means is illustrated as a limiting lever 101 which is pivotally mounted on a pin 102 and is biased by a spring 103 to turn in a counterclockwise direction from the position shown in FIG. 1. When the blocking lever 93 is held in an inoperative position by the selecting member 70 or by the electromagnet M2, the upper end portion 97 of the blocking lever engages a lower end portion 103a of the limiting lever 101 to hold it in inoperative position. Moreover, a projection 104 of the limiting lever 101 slidably engages a side edge 105 of the selecting member 70 to hold the limiting lever in inoperative position. When the selecting member 70 has been moved downwardly a selected distance, an inclined portion 116 of its side edge permits the limiting lever 101 to be turned in a counterclockwise direction by its spring 103 to an operative position in which an upper end portion 107 is in the path of movement of a limiting edge portion 108 of the release lever 1, provided that the limiting lever 101 is not held in inoperative position by the blocking lever 93 under action of the electromagnet M2. When the limiting lever 101 is in operative position, it limits downward movement of the release lever 1 so as to prevent engagement of the pin 24 with the detent member 47 to release the shutter. A manually operable pin or detent 101b may be provided for selectively holding the limiting lever 101 in inoperative position to permit making a daylight exposure with an appropriately long exposure time in the event light conditions would normally call for a flash exposure but no operative flash device has been provided.

An electric circuit cooperating with the mechanism of FIG. 1 is shown in FIG. 2 in which identical parts have been indicated by the same reference numerals as in FIG. 1. The circuit includes a main control circuit for sensing the brightness of an intended subject prior to the starting of an exposure to control the selection between a daylight exposure and a flash exposure, properly timing the exposure in accordance with the brightness of the subject if a daylight exposure is selected and providing a selected exposure time in the event a flash exposure is selected. The circuitry further includes a flash operating circuit and a detecting circuit for determining whether a flash illumination device has been provided.

The main control circuit is shown as comprising a battery or other power source 60, a photoresistor 61, a condenser 62, variable resistances 63 and 64, fixed resistances 59 and 65, transistors 66 and 67, the operating coil 33 of electromagnet M1, the power source switch S1, changeover switch S2, timing switch S3 and the changeover switch S4.

The flash illumination circuit is shown as comprising the power source 60, a condenser 109, a fixed resistance 110, a flash illumination device shown as a flash bulb 111 and a synchroswitch S5, which is not shown in FIG. 1 but is associated with the shutter operating ring 40 so as to close at the proper time synchronized with the opening of the shutter. The detecting circuit is shown as comprising the power source 60, power source switch S1, the coil 92 of the electromagnet M2 and a switch S6 which is automatically operated in accordance with the attachment or detachment of the flash 111.

The transistors 66 and 67 with associated components comprise a modified schmidt multivibrator so that when one of the transistors is conductive, the other becomes nonconductive. The changeover from one transistor to the other occurs very rapidly. The coil 33 of the electromagnet M1 is connected in the collector circuit of the transistor 67 so that the electromagnet is energized when transistor 67 is conducting. Conversely, the electromagnet is deenergized when transistor 67 is nonconductive.

The positions of the switches shown in FIG. 2 correspond to the condition of the mechanism as illustrated in FIG. 1. When the release lever 1 (FIG. 1) is moved down a slight amount so as to close the power switch S1, while the other switches remain in the positions shown in FIG. 1 and FIG. 2, the timing condenser 62 is disconnected by switches S2 and S4 and the circuit functions as a circuit for detecting the brightness of a subject to determine whether a daylight exposure or a flash exposure should be used. Whether the transistor 66 is conducting or nonconducting is determined by the base voltage and the emitter voltage of the transistor as determined by the setting of variable resistance 64 and the ratio of the resistance of the photoresistive element 61 with that of the variable resistance 63 which has been set in accordance with the selected brightness required for a daylight exposure. If the values are such that transistor 66 conducts, the transistor 67 will be nonconducting and hence the electromagnet coil 33 will not be energized.

When the release lever 1 is moved farther so that a shoulder 17' permits switch lever 21 to turn clockwise to cause contact piece 18 of the changeover switch S2 to be connected to contact 23, the variable resistance 63 is disconnected and the condenser 62 is connected in circuit with the photoresistor 61 so as to form a delay circuit. As the timing switch S3 is closed so as to short circuit the condenser 62, the transistor 66 is reverse biased and the transistor 67 is forward biased so that a current will flow in the electromagnet coil 33. When the timing switch S3 opens, as occurs when the projection 44 on ring 40 is released by the detent 47 to start an exposure, the condenser 62 begins to charge. After a period of time determined by the capacity of the condenser 62 and the resistance of the photoresistor 61 according to the brightness of the subject, the transistor 66 is forward biased so as to become conductive while the transistor 67 is reverse biased and becomes nonconductive so that the electromagnet coil 33 is deenergized.

When the contact piece 18 of changeover switch S2 is connected to contact 23 as described and selecting member 70 has moved downwardly sufficiently for switch lever 83 to ride down shoulder 80 so that contact piece 84 of changeover switch S4 is connected to contact 86, the photoresistor 61 is disconnected and the fixed resistance 101 is substituted for it in the timing circuit to provide an exposure time of predetermined length for flash photography. In this event, the synchrocontact S5 will be closed in accordance with rotation of the ring 40 so as to connect the flash device 103 to the condenser 100 charged through a fixed resistance 102 to illuminate the flash device 111.

The switch S6 is associated with a holder or socket for the flash device so as to be closed when a flash device such as the flashbulb 111 is in position for operation. When the switch S6 is closed and the release lever 1 has been moved down sufficiently to permit the closing of power switch S1, the coil 92 of the electromagnet M2 is connected to the power source 60 and thereby energized so as to hold the blocking lever 93 (FIG. 1) in inoperative position.

OPERATION

In operation, the release lever 1 is moved progressively downwardly from the initial position shown in FIG. 1. In a first increment of movement, the pin 7 on the release lever 1 permits the contact piece 8 of the power source switch S1 to move downwardly into engagement with the contact 9 so as to close the switch and thereby supply power to the control circuit and the detecting circuit. In a first stage of operation, before any exposure is started, the control circuit operates as a detecting circuit to sense the brightness of the subject to be photographed and determine whether the exposure should be a daylight exposure taken with ambient light or a flash exposure. By reason of the tension of spring 75, the arm 70a of the selecting member 70 is kept in contact with pin 24 on the release lever 1 so that the selecting member moves downwardly with the release lever unless restrained by other means. The brightness of the subject is sensed by the photoresistor 61, the resulting resistance of which affects the bias on the transistor 66. If the brightness of the subject is greater than a predetermined value, the transistor 66 is forward biased so as to be conducting whereupon transistor 67 is nonconducting so that no current will flow in the coil 33 of electromagnet M1. When the brightness of the subject is less than the selected value, the transistor 66 is reverse biased so as to be nonconducting whereupon transistor 67 is conducting and supplies current to the electromagnet.

As the release lever 1 continues to move downwardly, the pin 15 on the closing lever 14 comes to the step 26 in the side face of the release lever so as to permit clockwise rotation of the closing lever by springs 12 and 13. However, if the electromagnet M1 is energized, its attraction of the armature 32 holds the closing lever against rotation. Hence, if the brightness of the subject is less than the selected value, current is supplied to the electromagnet coil 33 so that the closing lever 14, middle lever 38 and locking lever 48 are retained in the position shown in FIG. 1. The hook portion 50 of the locking lever is thereby held out of the path of the engaging portion 25 of the selecting member 70 to permit continued downward movement of the selecting member with the release lever 1 so as to provide for a flash exposure. If, on the other hand, the brightness of the subject is greater than the selected value, the electromagnet M1 is deenergized and closing lever 14 is turned about its pivot in a clockwise direction by springs 12 and 13 and permits the middle lever 38 to be turned in a counterclockwise direction by its spring 37 so as to swing the locking lever 48 into a position in which the hook portion 50 is in the path of movement of the engaging portion 25 of the selecting member 70. Downward movement of the selecting member is thereby stopped when the engaging portion 25 reaches the hook portion 50 of the locking lever 48. The selecting member is thereby held in a position for a daylight exposure. In this position the index 88 of the selecting member is opposite the indicia 89 which is shown as reading "-DAYLIGHT". Even though the closing lever 14 and middle lever 38 are thereafter returned to the position shown in FIG. 1, the locking lever 48 will be retained in locking position by interengagement of the hook portion 50 with the engaging portion 25 of the selecting member.

When the brightness of the subject is less than a selected value so that a flash exposure is appropriate, the electromagnet M1 is energized and the locking lever 48 is retained in the retracted position shown in FIG. 1 as previously described until the engaging portion 25 passes the hook portion 50 so that the selecting member 70 continues to move downwardly with the release lever 1. When engaging portion 25 of the selecting member 70 has passed the hook portion 50 of the locking lever 48, downward movement of the selecting member can no longer be restrained by the locking 48 even though the closing lever 14 is thereafter released so as to move to closing position. Hence, unless blocked by the blocking lever 93 as described below, the selecting member 70 continues to move downwardly with the release lever 1 so as to effect a flash exposure.

When the brightness of the subject is above a selected value so that a daylight exposure is selected, downward movement of the selecting member 70 is halted by the locking lever 48 as described above while the release lever 1 continues to move downwardly. At a predetermined point in the downward movement of the release lever 1, the switch lever 21 of the changeover switch S2 rides off a step 17' of the side face 17 so as to turn in a clockwise direction and thereby disconnect the contact piece 18 from contact 22 and connect it with contact 23. There is thus provided a time delay circuit comprising the condenser 62 and the photoresistor 61. As the release lever 1 moves downwardly, the pin 15 on the closing lever 14 is engaged by side face 29 so as to position the closing lever 14 in open position. Upon further downward movement of the release lever 1, recessed portions 30 and 31 of the side face permit clockwise pivotal movement of the closing lever 14. However, since the timing switch S3 is closed and short circuits the condenser 62, the transistor 66 is reverse biased so as to be nonconducting and the transistor 67 is forward biased so as to be conducting and supply current to the electromagnet M1. The closing lever 14 is thereby retained in its open position by the electromagnet.

Upon further downward movement of the release lever 1, the pin 24 engages the detent 47 so as to pivot it in a clockwise direction and thereby release it from the projection 44 of the shutter operating ring 40. The ring 40 is thereupon rotated in a clockwise direction by the spring 12 to open the shutter and thereby begin an exposure. Upon rotation of the ring 40 to the right, the pin 52 permits the timing switch S3 to open. The condenser 62 is hence no longer shorted and proceeds to charge through the photoresistor 61 at a rate which depends on its resistance and hence on the brightness of the subject. When the terminal voltage of the condenser 62 reaches a sufficient voltage to provide a forward bias for the transistor 66, that transistor becomes conductive and transistor 67 is cut off so as to deenergize the electromagnet 33 and thereby permit rotation of the closing lever in a clockwise direction. The side face 43 of the closing lever 14 engages pin 41 on the ring 40 to rotate the ring in a counterclockwise direction and thereby close the shutter to terminate the exposure. The exposure having been completed, the release lever 1 is permitted to move upwardly under tension of the spring 6 whereupon the mechanism returns to the initial state shown in FIG. 1.

When the brightness of the subject to be photographed is less than a predetermined value so as to indicate a flash exposure, the locking lever 48 is retained in an inoperative position as described above so that the selecting member 70 continues to move downwardly with the release lever 1, providing that its downward movement is not halted by the blocking lever 93. Downward movement of the selecting member 70 thus continues until one or another of the steps of the stepped surface 76 engages the upper end of the setting lever 78 depending on the position of the setting lever according to the speed of the film being used. In this position the pointer 88 registers with indicia 91 reading, for example, "FLASH".

As the release lever 1 and selecting member 70 move downwardly, the switch lever 21 of changeover switch S2 is turned clockwise as described above to disconnect the contact piece 18 from contact 22 and connect it with contact 23 and the switch lever 83 rides off a step 80 from the side face 79 so that the contact piece 84 of the changeover switch S4 is disconnected from contact 85 and connected with contact 86. There is thus provided a time delay circuit comprising the condenser 62 and the fixed resistance 59. Upon further downward movement of the release lever 1, an exposure is effected in the same manner as described for a daylight exposure except that since the resistance of the timing circuit is of fixed value, the exposure time is correspondingly fixed, for example one-thirtieth of a second. The device 87 selects the proper aperture setting according to the position at which the selecting member 70 is stopped by the setting lever 78 and the distance to the subject on which the camera is focused. Moreover, the synchroswitch S5 (not shown in FIG. 1) is actuated by rotation of the ring 40 so as to be closed in synchronism with the opening of the shutter and thereby illuminate the flash device 111. The exposure having been completed, the release lever 1 is permitted to move upwardly under tension of the spring 6 so as to restore the mechanism to its initial condition.

If the brightness of the subject is below a predetermined value so as to indicate a flash exposure but the switch S6 is open by reason, for example, of no proper flash illumination device having been supplied, the electromagnet M2 is deenergized so as to permit the blocking lever 93 to move to blocking position as soon as the projection 96 rides off of the side face 98 of the selecting member 70. Hence, although downward movement of the selecting member 70 is not halted by the blocking lever 48 it is blocked by the blocking lever 93 in a slightly lower position so that the pointer 88 registers with the indicia 90 reading, for example, "USE FLASH". The blocking lever 93 stops the downward movement of the selecting member 70 before the switch lever 83 of changeover switch S4 reaches the shoulder 80. Hence, the changeover switch S4 remains in the position shown in FIGS. 1 and 2 while the changeover switch S2 is actuated to connect the contact piece 18 with contact 23. There is thus provided a timing circuit comprising the condenser 62 and photoresistor 61 as in the case of a daylight exposure. Providing that the limiting lever 101 is omitted or is held in inoperative position, for example by the detent 101b, continued downward movement of the release lever 1 will result in making an exposure in the same manner as described for a daylight exposure. Since the photoresistor 61 is responsive to the brightness of the subject, an appropriately long exposure will be provided by the delay circuit. The connections of the device 87 are such that it is not operative when the downward movement of the selecting member 70 is blocked by the blocking lever 93.

In the event the limiting lever 101 is provided and is not held in inoperative position by the detent 101b, movement of the blocking lever 93 to a blocking position under the conditions just described results in the limiting lever 101 rotating in a counterclockwise direction so that its upper end 107 engages the portion 108 of the release lever 1 so as to stop downward movement of the release lever before the pin 24 engages the detent member 47 so as to release the shutter operating ring 40. Hence, the shutter is not opened to make an exposure. Registration of the pointer 88 on the selecting member 70 with the indicia 90 indicates that a flash device should be provided for making a flash exposure under the light conditions prevailing.

A modified circuit is shown in FIG. 3 in which corresponding components are designated by the same reference numerals as in FIG. 2. The circuit is in general the same as that of FIG. 2 except for differences with respect to the circuit for detecting whether an operative flash illumination device has been provided. This circuit comprises the power source 60, power source switch S1, electromagnet M2, contacts 112 and 113 for a flash bulb 111 together with the filament of the bulb and a resistance 110. It will be noted that the electromagnet M2 is connected in parallel with the condenser 109 for the flash illumination device.

When the power source switch S1 is closed, as occurs at the start of downward movement of the release lever 1 as described, current will flow through the coil 92 of the electromagnet M2 to energize the electromagnet and thereby hold the blocking lever 93 in inoperative position provided that the flash device 111 is in an operative state. However, if a flash bulb 111 has not been inserted in the socket or does not properly engage the contacts 112 and 113, or if the filament of the flash bulb is broken, the electromagnet M2 will not be energized and hence the blocking lever 93 will interrupt the downward movement of the selecting member 70 as described above. Moreover, if the battery 60 is too weak or if the condenser 109 does not charge properly—for example if the condenser is short circuited—there will not be sufficient current through the coil of the electromagnet M2 to hold the blocking lever 93 in inoperative position and hence downward movement of the selecting member 70 will be interrupted as described to prevent an attempted flash exposure. The operation with respect to the circuitry of FIG. 3 is otherwise the same as has been described with reference to FIGS. 1 and 2.

FIG. 4 shows a modification of the circuit for use with an electronic flash device. The main control circuit here represented by the block 120 is the same as in FIGS. 2 and 3. The circuitry for operating the flash device and for controlling the blocking lever 93 by means of the electromagnet M2 comprises a main condenser 115 connected through a resistance 121 to the output side of a DC power supply 114 connected by a switch S6 to the power source 60 and comprising an oscillator together with suitable transformers and rectifiers to provide a DC voltage of the required value for operation of the flash device. The switch S6 may be arranged to be closed when the flash device is attached to the camera or may be operated manually or by the operating mechanism of FIG. 1. The coil 92 of the electromagnet M2 is connected in series with a resistance 116 across the terminals of the condenser 115. A trigger condenser 117 is connected in parallel with the electromagnet M2 and a trigger transformer 118 is connected across the trigger condenser 117 by the synchroswitch S5 which, as described above, is actuated by movement of the shutter control ring 40 when making a flash exposure. The output of the trigger transformer is connected to a flash discharge tube 119 connected across the main transformer 115.

The chief cause for a strobe light not effecting proper illumination is insufficient charge of the main condenser 115. With the circuitry shown in FIG. 4, if the condenser 115 does not charge properly the electromagnet M2 is not energized sufficiently to hold the blocking lever 93 in inoperative position. Hence, if the brightness of the subject is below a predetermined level so as to indicate a flash exposure, downward movement of the selecting member 70 will be blocked by the blocking lever 93 so as to indicate that a flash exposure should be used but that the flash illumination device is not in an operative state. Except for the difference described the operation of the apparatus is the same as has been described with respect to FIGS. 1 and 2. Other circuitry may be used for sensing the charging voltage of the main condenser 115 and thereby control the excitation of the electromagnet M2 controlling operation of the blocking lever 93.

Furthermore, with reference to FIG. 1, the action of the spring 6 may, if desired, be reversed so as to move the release lever 1 in a downward direction. The release lever in this event is raised to its upper limit where it is held by a suitable detent or trigger which is released to permit downward movement of the release lever by its spring with suitable speed control to carry out the functions described above. Moreover, other means such as mechanical linkage may be provided for controlling the blocking lever 93 in accordance with whether or not a flashbulb or other flash device has been supplied for taking a flash exposure.

With the construction and function as described, the camera will automatically make a daylight exposure or a flash exposure in accordance with the brightness of the subject to be photographed but the taking of a flash exposure is avoided in the event a proper flash device has not been provided. Failure of flash photography due to improper illumination is thereby avoided.

I claim:

1. In combination with a camera shutter, operating means for opening and closing the shutter to make an exposure, electric circuit means including means for sensing the brightness of a selected subject prior to the opening of the shutter for an exposure, selecting means responsive to said sensing means to select between an ambient light exposure and a flash exposure according to the brightness of the subject, means responsive to said sensing means for regulating the exposure according to the brightness of the subject in the event an ambient light exposure is selected, means for providing flash illumination in the event a flash exposure is selected, detecting means for determining whether said flash illumination means is in an operative state to take a flash exposure, and means controlled by said detecting means for preventing the selection of a flash exposure by said selecting means when said flash illumination means is not in an operative state.

2. A camera shutter combination according to claim 1, in which said flash illumination means comprises a flash discharge tube, a condenser, means for charging the condenser and means for connecting the charged condenser to said flash discharge tube, and in which said detecting means comprises means for detecting the proper charging of said condenser.

3. A camera shutter combination according to claim 1, comprising means controlled by said detecting means for preventing an exposure when the brightness of the subject is below a selected value and said flash illumination means is not in an operative state.

4. A camera shutter combination according to claim 1, comprising means controlled by said detecting means and said selecting means for indicating that said flash illumination means is not in an operative state when the brightness of the subject is below a selected value.

5. In combination with a camera shutter, operating means for opening and closing the shutter to make an exposure including a release member movable through a predetermined stroke to effect an exposure, a selecting member biased to move with said release member and operable to select between a flash exposure and an ambient light exposure, electric circuit means including means for sensing the brightness of a selected subject prior to an exposure, means controlled by said sensing means for controlling movement of said selecting member to select an ambient light exposure when the brightness of said subject is above a selected value and to select a flash exposure when the brightness of said subject is below a selected value, means for providing flash illumination in the event a flash exposure is selected, means for detecting whether said flash illumination means is in an operative state to take a flash exposure and means controlling said selecting member to prevent operation of said selecting member to select a flash exposure when said flash illumination means is not in an operative state.

6. A camera shutter combination according to claim 5, comprising means controlled by said detecting means and said selecting means to block movement of said release member and thereby prevent an exposure when the brightness of the subject is below a selected value and said flash illumination means is not in an operative state.

7. A camera shutter combination according to claim 5, in which said means for preventing operation of said selecting member to select a flash exposure comprises an electromagnet and means controlled by said electromagnet for blocking movement of said selecting member.